(12) United States Patent
Szepessy

(10) Patent No.: US 9,714,591 B2
(45) Date of Patent: Jul. 25, 2017

(54) CRANKCASE GAS SEPARATOR

(71) Applicant: ALFA LAVAL CORPORATE AB, Lund (SE)

(72) Inventor: Stefan Szepessy, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 100 days.

(21) Appl. No.: 14/350,274

(22) PCT Filed: Oct. 19, 2012

(86) PCT No.: PCT/EP2012/070735
§ 371 (c)(1),
(2) Date: Apr. 7, 2014

(87) PCT Pub. No.: WO2013/057240
PCT Pub. Date: Apr. 25, 2013

(65) Prior Publication Data
US 2014/0237961 A1    Aug. 28, 2014

(30) Foreign Application Priority Data
Oct. 20, 2011 (EP) .................................... 11185943

(51) Int. Cl.
*B01D 45/00* (2006.01)
*F01M 13/04* (2006.01)
(Continued)

(52) U.S. Cl.
CPC ............. *F01M 13/04* (2013.01); *B01D 45/14* (2013.01); *B01D 53/24* (2013.01); *B04B 5/12* (2013.01);
(Continued)

(58) Field of Classification Search
CPC ..... B01D 45/14; B04B 2005/125; B04B 5/12; B04B 9/02; Y10S 55/19; F01M 13/04;
(Continued)

(56) References Cited

U.S. PATENT DOCUMENTS 1,649,346 A    11/1927 Grimble et al.
2,919,848 A *   1/1960 Howe ....................... B04B 1/20
                                                        494/42
(Continued)

FOREIGN PATENT DOCUMENTS

CN      1608745 A    4/2005
CN      1675453 A    9/2005
(Continued)

OTHER PUBLICATIONS

DE 102010037488, Page Range 18 pages, Sep. 13, 2010.*
MOPX 207SGT-24, Separator Manual, Alfa Laval Separation AB, 1996, 220 pages.

*Primary Examiner* — Dung H Bui
(74) *Attorney, Agent, or Firm* — Birch, Stewart, Kolasch & Birch, LLP

(57) ABSTRACT

A gas separator for removing contaminants from a crankcase gas which is produced during operation of an internal combustion engine includes a centrifugal rotor with a plurality of separation discs for separating the contaminants from the crankcase gas, the centrifugal rotor being arranged inside a stationary rotor housing having a gas inlet for conducting crankcase gas to the centrifugal rotor and a gas outlet for discharging the cleaned crankcase gas from the centrifugal rotor, and an electric motor which is arranged for rotation of the centrifugal rotor about a rotational axis, and A gear device is arranged between the electric motor and the centrifugal rotor, the gear device having a gear ratio (Continued)

arranged to increase the rotational speed of the centrifugal rotor in relation to the electric motor.

16 Claims, 1 Drawing Sheet

(51) Int. Cl.
*B01D 53/24* (2006.01)
*B01D 45/14* (2006.01)
*B04B 9/02* (2006.01)
*B04B 5/08* (2006.01)
*B04B 1/00* (2006.01)
*B04B 5/12* (2006.01)
*F01M 13/00* (2006.01)
*F01N 3/021* (2006.01)
*F02M 25/06* (2016.01)

(52) U.S. Cl.
CPC ........ *B04B 9/02* (2013.01); *B04B 1/00* (2013.01); *B04B 5/08* (2013.01); *B04B 2005/125* (2013.01); *F01M 13/00* (2013.01); *F01M 2013/0422* (2013.01); *F01N 3/021* (2013.01); *F02M 25/06* (2013.01); *Y10S 55/19* (2013.01); *Y10S 494/90* (2013.01)

(58) Field of Classification Search
CPC .... F01M 2013/0422; F01M 13/00; F01N 9/002; F01N 3/021; F02M 25/06
USPC .............. 55/438, 385.1, 400–409, DIG. 19, 55/DIG. 30
See application file for complete search history.

(56) References Cited

U.S. PATENT DOCUMENTS

| | | | | |
|---|---|---|---|---|
| 4,226,359 A * | 10/1980 | Jacobson | ............. | H02K 7/16 494/39 |
| 5,364,335 A * | 11/1994 | Franzen | ............. | B04B 1/20 494/15 |
| 6,033,450 A * | 3/2000 | Krul | ............. | B01D 45/14 55/345 |
| 6,082,340 A * | 7/2000 | Heimark | ............. | F02B 33/40 123/559.1 |
| 6,213,929 B1 * | 4/2001 | May | ............. | B04B 5/005 494/24 |
| 7,540,944 B2 | 6/2009 | Bitterly et al. | | |
| 7,908,840 B2 * | 3/2011 | Schwarz | ............. | F01D 15/10 184/6.11 |
| 8,225,774 B2 * | 7/2012 | Chen | ............. | F01M 9/08 123/196 R |
| 2002/0026928 A1 * | 3/2002 | Korenjak | ............. | F01M 11/02 123/572 |
| 2003/0032541 A1 * | 2/2003 | Stroucken | ............. | B04B 1/20 494/53 |
| 2005/0211093 A1 * | 9/2005 | Latulipe | ............. | B01D 50/002 95/270 |
| 2005/0242683 A1 * | 11/2005 | Lau | ............. | H01R 39/381 310/239 |
| 2008/0264006 A1 * | 10/2008 | Nakamura | ............. | B01D 45/16 55/291 |
| 2009/0118111 A1 * | 5/2009 | Baumann | ............. | B04B 5/005 494/49 |
| 2010/0180854 A1 * | 7/2010 | Baumann | ............. | B04B 5/005 123/196 A |
| 2011/0120303 A1 * | 5/2011 | Bloom | ............. | B01D 45/14 95/32 |
| 2012/0174544 A1 * | 7/2012 | Tornblom | ............. | B04B 5/005 55/438 |
| 2012/0186565 A1 * | 7/2012 | Arima | ............. | F02B 33/40 123/559.1 |
| 2013/0231235 A1 * | 9/2013 | Wagenbauer | ............. | B04B 9/00 494/84 |

FOREIGN PATENT DOCUMENTS

| | | |
|---|---|---|
| CN | 1961139 A | 5/2007 |
| DE | 29 30 994 A1 | 2/1981 |
| EP | 1 347 194 A1 | 9/2003 |
| EP | 1 532 352 B1 | 11/2009 |
| EP | 1 537 301 B1 | 11/2009 |
| GB | 110219 | 10/1917 |
| GB | 508161 | 6/1939 |
| GB | 1302044 | 1/1973 |
| WO | WO 2005/119020 A1 | 12/2005 |
| WO | WO 2011/005160 A1 | 1/2011 |

* cited by examiner

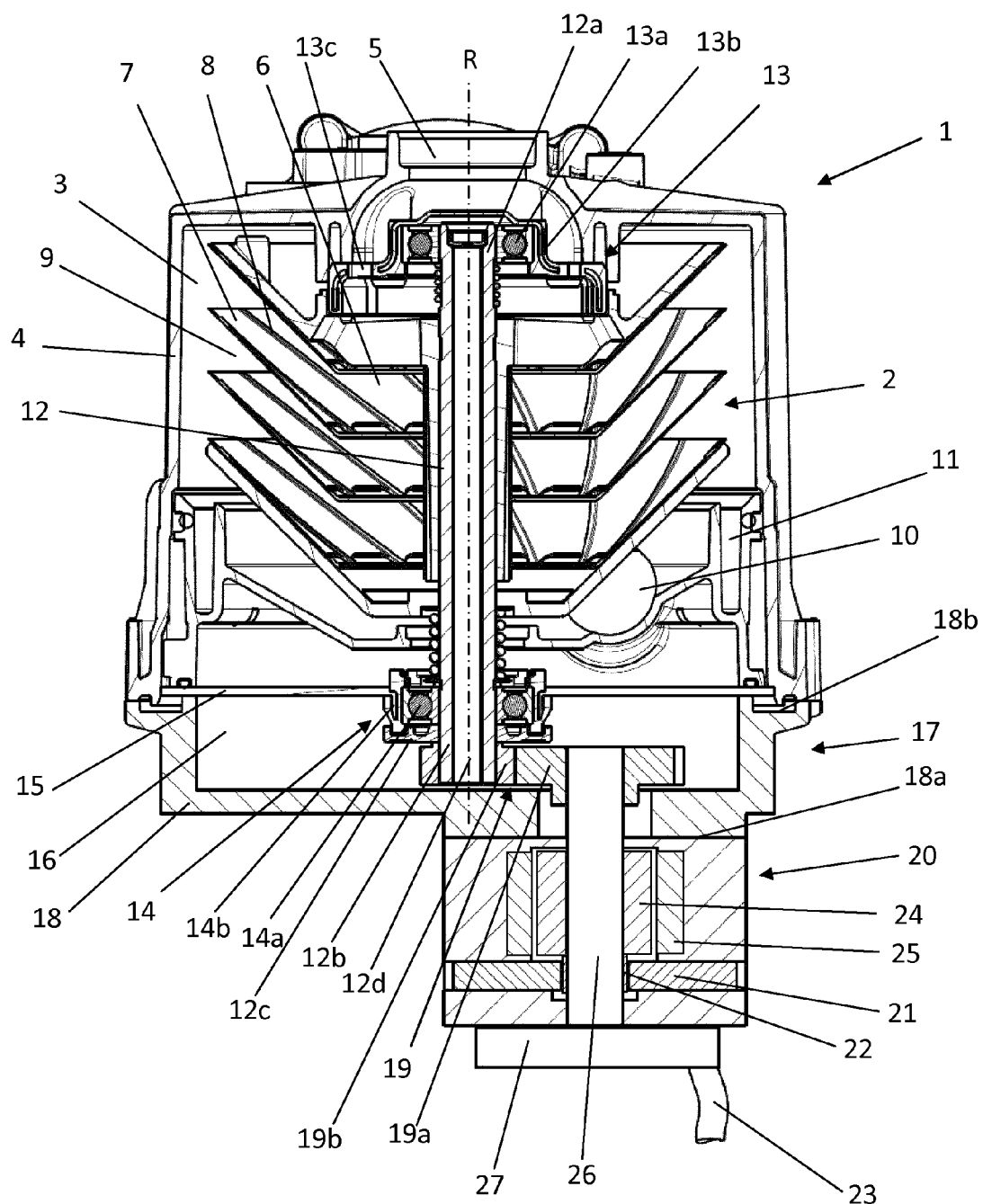

CRANKCASE GAS SEPARATOR

TECHNICAL FIELD

The invention relates to a crankcase gas separator for removing contaminants in the form of oil mist and soot particles from a crankcase gas which is produced during operation of an internal combustion engine. The crankcase gas separator comprises a centrifugal rotor with a plurality of separation discs for separating the contaminants from the crankcase gas, the centrifugal rotor being arranged inside a stationary rotor housing having a gas inlet for conducting crankcase gas to the centrifugal rotor and a gas outlet for discharging the cleaned crankcase gas from the centrifugal rotor, and an electric motor which is arranged for rotation of the centrifugal rotor about a rotational axis.

BACKGROUND ART

There has been a significant development within the technical field of crankcase gas cleaning. Increasingly tough environmental legislation has pushed the development of extremely efficient separators for removing particulate contaminants in the form of oil mist and soot particles from crankcase gas. At present, the most efficient crankcase gas separator comprises a centrifugal rotor having a stack of separation discs for separating the contaminants from the crankcase gas.

There are several ways of driving this centrifugal rotor. In a separator on the market today—the Alfdex® separator of the applicant—the centrifugal rotor may be driven either hydraulically or electrically.

The hydraulic drive comprises an oil turbine connected to the centrifugal rotor. A portion of the lubricating oil circulating in a combustion engine is conducted to a nozzle that directs an oil jet to drive the turbine of the centrifugal rotor. The advantage of this oil or hydraulically driven separator is that there already is an excess of oil flow available from the engine's lubrication pump. This is more than sufficient to drive the centrifugal rotor. Furthermore, the oil jet generates an oil mist through which the bearings of the centrifugal rotor are properly lubricated throughout the separator's service life. Last but not least, the hydraulic drive is both reliable and cost-efficient.

The other version of the Alfdex® separator comprises an electric drive with a brushless electric motor having a direct drive mechanism connecting the centrifugal rotor to the electric motor. This electric drive provides significantly lower energy consumption with cleaning efficiency adapted to the actual need. Accordingly, this version of the separator makes it possible to control the speed of the centrifugal rotor in an "efficiency-on-demand" operation. This technology is further described in documents EP 1537301 B1 and EP 1532352 B1.

The electric drive has great control capabilities and requires less intervention in the combustion engine, which simplifies installation. However, it involves a relatively high initial cost compared to the hydraulic version.

SUMMARY OF THE INVENTION

An object of the invention is to address the above-identified disadvantage by providing a more cost-efficient solution with top performance in separating efficiency.

This object is achieved by a crankcase gas separator initially defined, which is characterized in that a gear device is arranged between the electric motor and the centrifugal rotor, wherein the gear device has a gear ratio arranged to increase the rotational speed of the centrifugal rotor in relation to the electric motor.

In this way it is possible to use a "cheaper" or simpler electric motor than the mentioned brushless motor. A low-priced motor is not designed to run very fast, be it a DC or AC motor, or it will run fast but not last long because of for instance brush wear, bearing wear or overall overloaded circuitry. This motor would therefore normally not be considered for driving a centrifugal rotor of a crankcase gas separator (e.g. at centrifugal rotor speeds of 6000-14 000 rpm). It is desirable to drive the centrifugal rotor as fast as possible in order to achieve as high separating efficiency as possible. In addition, the centrifugal rotor of the crankcase gas separator is typically very small in size and diameter, which will also allow (and require) a higher speed than a centrifugal rotor of larger size and diameter. The electric motor may by means of the gear device run relatively slow, while the centrifugal rotor is driven at such high speeds that an efficient cleaning of crankcase gas is achieved. Accordingly, the invention provides a cost-efficient solution in the possibility of using a simpler electric motor, while top performance in separating efficiency is achieved through the gear device increasing the centrifugal rotor speed.

The invention would be particularly useful for, but not limited to, a crankcase gas separator adapted to a small-sized engine used for instance in a passenger car or a light transport vehicle. First of all, the hydraulic drive version will not be able to fit in the engine space therein. Furthermore, the small-sized engine will in most cases not deliver the surplus of oil flow from the engine's lubrication pump as in a heavy commercial vehicle. The mentioned hydraulic drive version is therefore not even an option here. Secondly, the quality of the simple electric motor is sufficient for most applications of smaller engines, e.g. in passenger cars or light transport vehicles. The life expectancy of the passenger car is about 3000 hours of operation. This can be compared to some 20 000 hours of operation which is expected for heavy commercial vehicles, such as trucks and buses.

In an embodiment of the invention, the electric motor includes brushes. The life of a brushed motor is in this case more than enough to last the life of a passenger car. An advantage of the brushed motor is that it requires no electronics for basic running. Furthermore, the brushed motor is an extremely common type of electric motor on the market today, and consequently it is a very cost-efficient alternative. The gear ratio in accordance with the invention is adapted to let the motor run slow enough to minimize wear on the brushes, while the centrifugal rotor is rotated at a speed sufficient to achieve the efficient cleaning of crankcase gas. Accordingly, the gear device will enable a lower top speed of the brushed motor, and thereby minimize the wear on the brushes.

In a further embodiment of the invention, the brushes are configured as replaceable brush units. In this way the brushes may easily be changed if or as they wear out. The overall life of the motor and the separator may thereby be extended by simply replacing the brushes. The replaceable brush unit may for instance be a carbon brush configured as a cartridge containing a piece of carbon which is pressed, e.g. by a spring, against the rotor (commutator) of the motor. When the piece of carbon is worn out, the brush unit is simply replaced with a new one.

In another embodiment of the invention, the separator is configured for basic running of the brushed motor at constant speed. As previously mentioned the brushed motor requires no electronics for basic running. This is not the case with the previously mentioned brushless motor (or BLDC). In order to run, the BLDC motor requires a special electronic controller, which is expensive to produce as it involves temperature resistant electronics integrated in a compact manner on the separator. The brushed motor will run without any electronics, but is then limited to basic running (i.e. at a speed depending on the voltage of the connected current source onboard the vehicle).

However, this invention is not limited to basic running of the electric motor. It is also possible to control the speed of the brushed motor by varying the voltage applied across the motor. This may be achieved through a control unit comprising electronic speed control (or ESC). In an embodiment of the invention the motor is connected to such a control unit for changing the rotational speed of the motor and, thereby, the centrifugal rotor during maintained operation of the combustion engine. Operating the motor in the previously mentioned "efficiency-on-demand" manner (also described in EP 1537301 B1) will not only save energy and cost in the long run, but it will also reduce the wear on both the motor and the bearings of the centrifugal rotor.

According to a further embodiment of the invention, the gear device comprises a toothed gear wheel transmission. This could for instance be a spur gear, helical gear, bevel gear or worm gear. The worm gear would be a very suitable choice for a lower-speed motor which demands a higher gear ratio for the centrifugal rotor to rotate fast enough. The worm gear furthermore yields a very compact centrifugal rotor-gear-motor-configuration (whereas the spur gear would give a more elongated configuration). The gear device may also be chosen in view of the available space for fitting the separator in the vehicle. For instance, the gear device may comprise a toothed gear wheel which is configured such that the centrifugal rotor, or rather the rotor housing, and the electric motor are arranged in a side-by-side manner on a common side of the gear device. Furthermore, the gear device and the electric motor may be arranged at either the bottom or top side of the centrifugal separator.

The gear device may furthermore be produced with a low cost ambition (e.g. gear wheels in plastic). Furthermore, it does not necessarily have to involve gear wheels. It could for instance involve a chain drive with differently sized chain wheels or a belt drive with differently sized pulleys. These types of transmissions may however be less suitable as they significantly increase the footprint of the separator in an already limited space inside the vehicle's engine compartment. The gear device may involve a continuous variable transmission (CVT). In this way, the electric motor may run at a certain (optimum) speed as the centrifugal rotor is gradually accelerated to higher speeds through the variable gear ratio.

In a further embodiment of the invention, the gear ratio is arranged to increase the rotational speed of the centrifugal rotor in a range of 2-10 times that of the rotational speed of the electric motor. The gear ratio chosen may depend on the characteristics of the electric motor. For instance, the brushed motor will typically be designed to run somewhere in the range of 1 000-4 000 rpm. Within that range, the gear ratio is suitably adapted to spin the centrifugal rotor somewhere in the range of 2-10 times the speed of the motor in order to achieve sufficient separating efficiency. A large-sized centrifugal rotor may achieve the required separating efficiency already at 5 000 rpm, whereas a very small-sized centrifugal rotor may require 18 000 rpm to reach sufficient separating efficiency. The gear ratio is preferably configured in the higher register within this range, such as in the range of 5-10 times that of the rotational speed of the electric motor. For example, if the motor is designed to run at around 1000 rpm, it would be suitable to arrange a gear device, such as a worm gear, having a gear ratio such that the centrifugal rotor spins in the range of 8-10 times the speed of the motor.

In another embodiment of the invention, the gear device comprises a gear housing delimiting a gear chamber which is configured between the electric motor and the rotor housing of the centrifugal rotor. This gear chamber inside the gear housing may be arranged to contain oil for lubricating the toothed gear wheel transmission of the gear device. Any suitable seal for the electric motor shaft may thereby be arranged in such a manner that outside dirt will not penetrate into the gear chamber inside the gear housing and/or lubricating oil will not leak out of the gear housing. The gear housing may either be arranged as a separate housing part which is attached to the rotor housing or it may be integrated in one piece with the rotor housing.

In a further embodiment of the invention, the separator is arranged with a central channel in the centrifugal rotor for communicating lubricating oil between the gear chamber inside the gear housing and at least one bearing of the centrifugal rotor. In this way, the lubricating oil for the gear device may also be used to lubricate said bearing of the centrifugal rotor. This bearing may for instance be situated at the centrifugal rotor's distal end to the gear housing, wherein the central channel is arranged to conduct an oil mist between the gear chamber inside the gear housing and said bearing. The gears of the gear device would generate, or at least could be arranged to generate, the oil mist during operation of the separator, wherein the oil mist is conducted to said bearing through the central channel.

In a further embodiment of the invention, the gear device is arranged to be lubricated by the oil contained in the crankcase gas. This may either be achieved by conducting at least a portion of the crankcase gas (containing oil mist) through the gear device, or it may also be achieved by draining at least a portion of the separated oil out of the separator via the gear device. The oil contained in the crankcase gas is thereby used to lubricate the gear device in a continuous manner during operation of the centrifugal separator. The gear housing of the gear device may in turn be arranged with an oil inlet for separated oil and an oil outlet for conducting the oil back to the crankcase. All of the separated oil may be drained via the gear housing of the gear device. It is also possible to drain a major portion of the separated oil directly back to the crankcase through an oil outlet in the rotor housing, wherein a remaining portion of oil is drained via the gear housing.

In an embodiment of the invention, at least a portion of the separated oil from the crankcase gas is arranged to be drained through a bearing of the centrifugal rotor which is situated at a centrifugal rotor's proximal end to the gear housing, whereby said bearing is lubricated by the separated oil which is drained through the bearing and into the gear chamber inside the gear housing.

In yet another embodiment of the invention, the central channel in the centrifugal rotor is communicating with a bearing of the centrifugal rotor which is situated at a centrifugal rotor's distal end to the gear housing, and wherein the centrifugal rotor is supported only in the bearings at the proximal and distal end. In this way, the gear device, as well as all of the bearings of the centrifugal rotor is lubricated by the separated oil from the crankcase gas.

In a further embodiment of the invention, the gear housing is configured as an interface between the rotor housing and the electric motor in such a way that the electric motor is mounted to the rotor housing via the gear housing, wherein the gear housing is provided with a first mounting surface for the electric motor and a second mounting surface for the rotor housing. In this way, the gear housing connects the electric motor to the rotor housing in a simple way to form a unit.

BRIEF DESCRIPTION OF THE DRAWING

An embodiment of the invention will now be described, by way of example, with reference to the accompanying schematic drawing, in which FIG. 1 shows a longitudinal section of a crankcase gas separator according to an embodiment of the invention.

DETAILED DESCRIPTION OF AN EMBODIMENT

FIG. 1 discloses a crankcase gas separator 1 according to an embodiment of the invention. The separator 1 includes a centrifugal rotor 2 which is rotatable around a rotational axis R. The centrifugal rotor 2 is situated in a separation chamber 3 inside a stationary rotor housing 4. The rotor housing 4 has a gas inlet 5 which is configured to conduct the contaminated crankcase gas into a central space 6 inside the centrifugal rotor 2. The centrifugal rotor 2 includes a stack of separation discs 7 arranged on top of each other. The separation discs 7 are provided with distance members 8 to provide axial interspaces 9 for through-flow of the gas from the central space 6 and radially outwardly. The height of the distance members 8 determines the size of the axial interspaces 9. Only a few separation discs 7 are shown with an extremely exaggerated size on the interspaces 9. In practice, however, the centrifugal rotor 2 would include many more separation discs 7 with much smaller interspaces 8 formed between mutually adjacent separation discs 7. The distance members 8 will typically be configured with a height to provide interspaces 9 having a size somewhere in the range of 0.2-0.6 mm.

During operation, the centrifugal rotor 2 will bring the crankcase gas into rotation, whereby contaminants mainly in the form of oil mist is separated by centrifugal forces in the rotating crankcase gas which is flowing through the thin interspaces 9 between the separation discs 7. The interspaces 9 open into a radial outer part of the separation chamber 3 which surrounds the centrifugal rotor 2. The cleaned crankcase gas is discharged into this outer part of the separation chamber 3 and is conducted out of the crankcase gas separator 1 through a gas outlet 10. The centrifugal forces acting on the rotating gas will cause the particulate contaminants to deposit on the surfaces of the separation discs 7. Separated contaminants (oil) will thereafter be thrown from the separation discs 7 of the centrifugal rotor 2 onto the inside wall of the stationary rotor housing 4. The contaminants (oil) will thereafter flow down along the inside wall of the rotor housing 4 to an annular collection groove 11 which is arranged to communicate with a oil outlet (not shown) for discharging a portion of collected contaminants (oil) out of the separator 1 and back to the crankcase of the combustion engine.

The separation discs 7 are mounted to a rotor shaft 12 of the centrifugal rotor 2. The rotor shaft 12 has a first end 12a which is rotatably supported in a first bearing unit 13. The first bearing unit 13 has a bearing 13a and a bearing holder 13b connected to the rotor housing 4 at the gas inlet 5. The first bearing holder 13b is cap-shaped and arranged across the gas inlet 5. The bearing holder 13b is provided with gas flow apertures 13c arranged radially outside the bearing 13a for allowing crankcase gas to pass from the gas inlet 5 into the central space 6 inside the stack of separation discs 7. Furthermore, a second bearing unit 14 is arranged near a second end 12b of the rotor shaft 12. Hence, the first and second bearing units 13, 14 are arranged on opposite sides of the stack of separation discs 7. The second bearing unit 14 includes a bearing 14a and a bearing holder 14b which is arranged in a partition 15.

The partition 15 divides the interior of the crankcase gas separator 1 into said separation chamber 3 and a gear chamber 16 of a gear device 17. The gear chamber 16 is shown below the partition 15 and is delimited by a gear housing 18. The rotor housing 4 and the gear housing 18 are connected to each other by means of any suitable fastener, such as screws (not shown), wherein the partition 15 is arranged to be clamped in between the rotor housing 4 and the gear housing 18. The rotor shaft 12 extends through the partition 15 and into the gear chamber 16. The gear device 17 comprises a toothed gear wheel transmission in the form of a spur gear 19 situated in the gear chamber 16.

The gear chamber 16 is arranged to contain oil for lubricating the spur gear 19. A portion of the separated oil collected in the groove 11 is arranged to be drained to the gear chamber 16 via the bearing 14a which is situated at the centrifugal rotor's proximal end to the gear housing 18. This oil is thrown into the gear chamber 16 by a washer member 12c situated inside the gear chamber 16 and attached at the second end 12b of the rotor shaft 12. This will in turn generate an oil mist inside the gear chamber 16 for lubricating the spur gear 19 in an efficient manner. Furthermore, the rotating gear wheels of the spur gear will in themselves generate further oil mist inside the gear chamber 16. The oil mist is furthermore conducted through a central channel 12d extending axially inside the rotor shaft 12 to the bearing 13a which is situated at the centrifugal rotor's distal end to the gear housing 18. Accordingly, the spur gear 19, as well as the bearings 13a and 14a, is effectively lubricated by the oil which is separated from the crankcase gas. Furthermore, the gear housing may be arranged to discharge any excess oil inside the gear chamber 16 back to the crankcase of the combustion engine.

A brushed DC electric motor 20 is situated below the gear housing 18 and attached to the gear housing 18 by means of screws (not shown). Accordingly, the gear housing 18 is configured as an interface between the rotor housing 4 and the electric motor 20 in such a way that the electric motor 20 is mounted to the rotor housing 4 via the gear housing 18. The gear housing 18 is hereby provided with a first mounting surface 18a for the electric motor 20 and a second mounting surface 18b for the rotor housing 4.

The brushed DC electric motor 20 is arranged with replaceable brush units 21 configured as cartridges. Each cartridge contains a piece of carbon which is pressed by means of a spring against a part of the electric motor which comprises a commutator 22. If the carbon piece wears out the brush unit 21 is simply replaced with a new one.

A power cable 23 is shown for feeding electric current to the brushed motor 20. The brush units 21 are configured to feed this electric current through the commutator 22, which in turn conducts the current to armature windings on a rotor 24 inside the brushed motor 20. Furthermore, a stator 25 is shown surrounding the rotor 24 inside the motor 20. The stator 25 comprises a permanent magnet providing the magnetic field against which the rotor field interacts to generate torque and rotate a drive shaft 26 of the brushed motor 20.

As previously mentioned, it is possible to control the speed by varying the voltage applied across the motor. The brushed motor is hereby provided with a control unit 27 comprising an electronic speed control (or ESC). In the shown embodiment of the invention the power cable 23 is provided with means for sending control signals to the control unit 27 to vary the voltage applied across the rotor 24 and thereby change the rotational speed of the motor 20. The control signals received by the control unit 27 will operate the brushed motor 20 in the previously mentioned "efficiency-on-demand" manner (also described in EP 1537301 B1). This saves both energy and cost in the long run, as well as reduces the wear on both the motor 20 and the bearings 13a and 14a of the centrifugal rotor 2.

As an alternative, the brushed motor 20 may however be arranged without such a control unit 27. Accordingly, the brushed motor 20 does not require such a control unit 27 for basic running, but it will then be limited to a speed depending on the voltage of the current source supplied through the power cable 23.

The drive shaft 26 of the motor 20 extends through the gear housing 18, wherein a first gear wheel 19a of the spur gear 19 is connected to the end of the drive shaft 26. The first gear wheel 19a is of relatively large size compared to a second gear wheel 19b which is connected to the second end 12b of the rotor shaft 12. Hence, the spur gear 19 provides a gear ratio which increases the rotational speed of the centrifugal rotor 2 in relation to the electric motor 20 (for instance to 3 times the rotational speed of the electric motor). This means that the brushed motor 20 may run at a substantially lower speed than the centrifugal rotor 2.

The strength of the brushed motor 20 is designed such that it can handle the increased torque required to spin the centrifugal rotor 20 via the gear device 19. However, this torque requirement is not that high as the centrifugal rotor 2 of the crankcase gas separator exhibits a low rotational inertia due to its relatively small size and light weight (e.g. with separation discs 7 made of plastic).

From the description above follows that, although an embodiment of the invention has been described and shown, the invention is not restricted thereto, but may also be embodied in other ways within the scope of the subject-matter defined in the following claims. For example, the centrifugal rotor 2 may be situated inside a part of the combustion engine, such as a valve cover, forming the stationary rotor housing 4. Furthermore, the electric motor may be a direct-current (DC) or alternating-current (AC) motor; a synchronous or asynchronous motor. For instance, an extremely common and in general very cheap motor is the asynchronous AC motor which according to the invention could be used to drive the centrifugal rotor via the gear device. This motor could furthermore be connected directly to a generator of a vehicle, whereby the frequency of the generator would be followed by the motor, i.e. the motor speed (and centrifugal rotor speed) would vary with the generator speed.

The invention claimed is:

1. A crankcase gas separator for removing contaminants in the form of oil mist and soot particles from a crankcase gas produced during operation of an internal combustion engine, said crankcase gas separator comprising:
    a centrifugal rotor with a plurality of separation discs for separating the contaminants from the crankcase gas, the centrifugal rotor being arranged inside a stationary rotor housing having a gas inlet for conducting crankcase gas to the centrifugal rotor and a gas outlet for discharging the cleaned crankcase gas from the centrifugal rotor;
    an electric motor arranged for rotation of the centrifugal rotor about a rotational axis; and
    a gear device arranged between the electric motor and the centrifugal rotor, the gear device having a gear ratio arranged to increase the rotational speed of the centrifugal rotor in relation to the electric motor,
    wherein the gear device comprises a gear housing delimiting a gear chamber, the gear chamber inside the gear housing being arranged to contain oil for lubricating the gear device, and
    wherein the separator is arranged with a channel in the centrifugal rotor for communicating said lubricating oil between the gear chamber inside the gear housing and at least one bearing of the centrifugal rotor.

2. The crankcase gas separator according to claim 1, wherein the electric motor is configured for basic running at constant speed.

3. The crankcase gas separator according to claim 1, wherein the electric motor is connected to a control unit for changing the rotational speed of the motor and thereby the centrifugal rotor during maintained operation of the internal combustion engine.

4. The crankcase gas separator according to claim 1, wherein the gear device comprises a toothed gear wheel transmission.

5. The crankcase gas separator according to claim 1, wherein the gear ratio is arranged to increase the rotational speed of the centrifugal rotor in a range of 2-10 times that of the rotational speed of the electric motor.

6. The crankcase gas separator according to claim 1, wherein the gear device is arranged to be lubricated by the oil contained in the crankcase gas and separated oil from the crankcase gas is arranged to be drained through a bearing of the centrifugal rotor which is situated at a centrifugal rotor's proximal end to the gear housing, whereby said bearing is lubricated by the separated oil which is drained through the bearing and into the gear chamber inside the gear housing.

7. The crankcase gas separator according to claim 1, wherein the gear device is arranged to be lubricated by the oil contained in the crankcase gas and separated oil from the crankcase gas is arranged to be drained through a bearing of the centrifugal rotor which is situated at a centrifugal rotor's proximal end to the gear housing, whereby said bearing is lubricated by the separated oil which is drained through the bearing and into the gear chamber inside the gear housing,
    wherein the central channel in the centrifugal rotor is communicating with a bearing of the centrifugal rotor which is situated at a centrifugal rotor's distal end to the gear housing, and
    wherein the centrifugal rotor is supported only in the bearings at the proximal and distal end.

8. The crankcase gas separator according to claim 1, wherein the gear housing is configured as an interface between the rotor housing and the electric motor in such a way that the electric motor is mounted to the rotor housing via the gear housing, wherein the gear housing is provided with a first mounting surface for the electric motor and a second mounting surface for the rotor housing.

9. The crankcase gas separator according to claim 1, wherein the electric motor includes brushes.

10. The crankcase gas separator according to claim 9, wherein the brushes are configured as replaceable brush units.

11. The crankcase gas separator according to claim 10, wherein the electric motor is configured for basic running at constant speed.

12. The crankcase gas separator according to claim 10, wherein the electric motor is connected to a control unit for changing the rotational speed of the motor and thereby the centrifugal rotor during maintained operation of the internal combustion engine.

13. The crankcase gas separator according to claim 10, wherein the gear device comprises a toothed gear wheel transmission.

14. The crankcase gas separator according to claim 9, wherein the electric motor is configured for basic running at constant speed.

15. The crankcase gas separator according to claim 9, wherein the electric motor is connected to a control unit for changing the rotational speed of the motor and thereby the centrifugal rotor during maintained operation of the internal combustion engine.

16. The crankcase gas separator according to claim 9, wherein the gear device comprises a toothed gear wheel transmission.

\* \* \* \* \*